(12) United States Patent
Ishikawa et al.

(10) Patent No.: US 9,239,245 B2
(45) Date of Patent: Jan. 19, 2016

(54) LANE GUIDANCE DISPLAY SYSTEM, METHOD, AND PROGRAM

(71) Applicant: AISIN AW CO., LTD., Anjo-shi, Aichi-ken (JP)

(72) Inventors: Ken Ishikawa, Okazaki (JP); Yoshito Kondo, Okazaki (JP); Yuusuke Morita, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 20 days.

(21) Appl. No.: 14/343,437

(22) PCT Filed: Oct. 4, 2012

(86) PCT No.: PCT/JP2012/006391
§ 371 (c)(1),
(2) Date: Mar. 7, 2014

(87) PCT Pub. No.: WO2013/069199
PCT Pub. Date: May 16, 2013

(65) Prior Publication Data
US 2014/0229106 A1    Aug. 14, 2014

(30) Foreign Application Priority Data
Nov. 8, 2011   (JP) .................................. 2011-244739

(51) Int. Cl.
*G01C 21/36*    (2006.01)
*G06K 9/00*    (2006.01)

(52) U.S. Cl.
CPC ........ *G01C 21/3658* (2013.01); *G01C 21/3647* (2013.01); *G06K 9/00671* (2013.01); *G06K 9/00798* (2013.01)

(58) Field of Classification Search
None
See application file for complete search history.

(56) References Cited

U.S. PATENT DOCUMENTS 7,216,035 B2 * 5/2007 Hortner et al. ................ 701/435
8,239,131 B2    8/2012 Kindo et al.
(Continued)

FOREIGN PATENT DOCUMENTS

DE   10 2007 053 305 A1   5/2009
EP       2 159 541 A1   3/2010
(Continued)

OTHER PUBLICATIONS

International Search Report issued in International Patent Application No. PCT/JP2012/006391 dated Jan. 15, 2013.
(Continued)

*Primary Examiner* — Yonel Beaulieu
*Assistant Examiner* — Krishnan Ramesh
(74) *Attorney, Agent, or Firm* — Oliff PLC (57) ABSTRACT

A lane guidance display system causes a display section to display a forward image on which a first guide line is superimposed in the case where a travel lane is not branched, the first guide line having, as an end point of the first guide line on the front side, a first front-side end point indicating the center position of the travel lane in the width direction, and causes the display section to display the forward image on which a second guide line is superimposed in the case where the travel lane is branched into a plurality of branched lanes, the second guide line having, as an end point of the second guide line on the front side, a second front-side end point indicating a position in the travel lane on the target lane side with respect to the center position of the travel lane in the width direction.

7 Claims, 7 Drawing Sheets

(56) References Cited

U.S. PATENT DOCUMENTS

| | | |
|---|---|---|
| 2005/0004753 A1* | 1/2005 | Weiland et al. ............... 701/208 |
| 2008/0195315 A1* | 8/2008 | Hu et al. ....................... 701/212 |
| 2008/0208450 A1 | 8/2008 | Katzer |
| 2009/0005980 A1* | 1/2009 | Nakao et al. .................. 701/210 |
| 2009/0012709 A1* | 1/2009 | Miyazaki ...................... 701/223 |
| 2009/0024321 A1* | 1/2009 | Bando et al. .................. 701/210 |
| 2010/0026804 A1* | 2/2010 | Tanizaki et al. ............... 348/148 |
| 2010/0231416 A1* | 9/2010 | Wu et al. ...................... 340/932.2 |
| 2010/0250116 A1* | 9/2010 | Yamaguchi et al. ........... 701/201 |
| 2010/0299063 A1* | 11/2010 | Nakamura et al. ............ 701/208 |
| 2011/0112756 A1* | 5/2011 | Winkler et al. ............... 701/201 |
| 2012/0259539 A1* | 10/2012 | Sumizawa .................... 701/400 |
| 2013/0151145 A1* | 6/2013 | Ishikawa ....................... 701/428 |
| 2013/0182957 A1* | 7/2013 | Wujcicki ....................... 382/191 |

FOREIGN PATENT DOCUMENTS

| | | |
|---|---|---|
| JP | A-10-281795 | 10/1998 |
| JP | A-2005-214857 | 8/2005 |
| JP | A-2008-309529 | 12/2008 |
| WO | WO 2009/149959 A1 | 12/2009 |

OTHER PUBLICATIONS

Written Opinion issued in International Patent Application No. PCT/JP2012/006391 dated Jan. 15, 2013.

* cited by examiner

LANE GUIDANCE DISPLAY SYSTEM, METHOD, AND PROGRAM

TECHNICAL FIELD

The present invention relates to a lane guidance display system, method, and program allowing display of guidance for a target lane to be traveled by a vehicle.

BACKGROUND ART

Hitherto, there has been known an art in which images of partition lines on the left and right of a travel lane currently traveled by a vehicle are recognized to display the forward image with a guide line superimposed at the middle between the images of the partition lines on the left and right of the travel lane on a forward image in which a scene ahead of the vehicle is captured (see PTL 1 (Japanese Patent Application Publication No. 2008-309529 (JP 2008-309529 A))). Since the guide line is superimposed at the middle between the recognized images of the partition lines on the forward image, the guide line can indicate the center position of the travel lane in the width direction with high accuracy.

CITATION LIST

Patent Literature

PTL 1: Japanese Patent Application Publication No. 2008-309529 (JP 2008-309529 A)

SUMMARY OF INVENTION

Technical Problem

If a driver directly visually recognizes or remembers a lane branch point ahead of the vehicle when the vehicle approaches the lane branch point, the driver recognizes that the vehicle should travel into any of branched lanes, although he/she may not be able to recognize which of the branched lanes to be traveled. Thus, if the guide line keeps indicating the center position of the travel lane in the width direction even when the driver recognizes that the vehicle should travel into any of the branched lanes, the driver may be impressed as if the vehicle should keep traveling on an extended line of a center line indicating the center position of the current travel lane in the width direction even after traveling past the lane branch point, which may give an uncomfortable feeling to the driver. In the case where a partition line partitioning a plurality of branched lanes exists on the extended line of the center line indicating the center position of the travel lane in the width direction, in particular, the driver may be impressed as if the vehicle should travel across the partition line, which may give a significant uncomfortable feeling to the driver.

The present invention has been made in view of the foregoing issue, and therefore has an object to provide an art that does not give an uncomfortable feeling to a driver in the case where a travel lane is branched ahead of a vehicle.

Solution to Problem

In the present invention, in order to achieve the foregoing object, a forward image acquisition unit acquires a forward image in which a scene ahead of a vehicle is captured. A travel lane specifying unit specifies a travel lane currently traveled by the vehicle. In the case where the travel lane is branched into a plurality of the branched lanes at a lane branch point ahead of the vehicle, a target lane specifying unit specifies a target lane to be traveled by the vehicle after traveling past the lane branch point. In the case where the travel lane is not branched into a plurality of the branched lanes at a lane branch point ahead, a display control unit causes a display section to display the forward image on which a first guide line is superimposed, the first guide line having, as an end point of the first guide line on a front side, a first front-side end point indicating a center position of the travel lane in a width direction. In the case where the travel lane is branched into a plurality of the branched lanes at a lane branch point ahead, on the other hand, the display control unit causes the display section to display the forward image on which a second guide line is superimposed, the second guide line having, as an end point of the second guide line on the front side, a second front-side end point indicating a position in the travel lane on a side of the target lane with respect to the center position of the travel lane in the width direction.

In the case where the travel lane is not branched into a plurality of the branched lanes at a lane branch point ahead, the display control unit causes the display section to display the first guide line having the first front-side end point indicating the center position of the travel lane in the width direction. This allows a driver to recognize that the vehicle should travel at the center position of the travel lane in the width direction. In the case where the travel lane is branched into a plurality of the branched lanes at a lane branch point ahead, on the other hand, the display control unit causes the display section to display the second guide line having the second front-side end point indicating a position in the travel lane on the target lane side with respect to the center position of the travel lane in the width direction. This allows the driver to be conscious of a position in the travel lane on the target lane side. That is, it is possible to prevent the driver from having an uncomfortable feeling that the vehicle should keep traveling at the center position of the current travel lane in the width direction even after traveling past the lane branch point.

The forward image acquisition unit may acquire a forward image in which a scene ahead of a vehicle is captured, and may acquire a forward image from a camera that includes a scene ahead of the vehicle in its field of view, for example. The phrase "ahead of a vehicle" means forward in the traveling direction of the vehicle. In particular, the phrase "front side of a certain lane" means the front side of the lane in the traveling direction of the vehicle (lane direction). The phrases "position of a front-side end point" and "position of a rear-side end point" mean the respective positions of the end points on a forward image, and the phrases "position indicated by a front-side end point" and "position indicated by a rear-side end point" mean the respective corresponding positions in the real space.

The travel lane specifying unit may specify the lane currently traveled by the vehicle as the travel lane, and may specify the lane in which the current position of the vehicle exists as the travel lane. The travel lane specifying unit may specify the current position of the vehicle in the forward image. The target lane specifying unit may specify the branched lane to be traveled by the vehicle as the target lane. The target lane may be a branched lane that allows the vehicle to reach a destination point in an expected travel path found in advance. The target lane specifying unit may specify as the target lane a branched lane that can be traveled safely or smoothly compared to other lanes in a section to be traveled by the vehicle after traveling past a lane branch point.

The display control unit may superimpose on the forward image at least the second guide line having the second front-side end point indicating a position in the travel lane on the target lane side with respect to the center position of the travel lane in the width direction. This is because the second front-side end point, which is an end point of the second guide line on the front side, indicates a position, among positions indicated by the second guide line, that is the farthest ahead of the vehicle, and therefore is recognized by the driver as a point indicating the position of the destination on a locus of a point indicated by the second guide line. Thus, the entirety of the second guide line may indicate a position in the travel lane on the target lane side with respect to the center position of the travel lane in the width direction, or only a part of the second guide line including the second front-side end point may indicate a position in the travel lane on the target lane side with respect to the center position of the travel lane in the width direction. Likewise, the entirety of the first guide line may indicate the center position of the travel lane in the width direction, or only a part of the first guide line including the first front-side end point may indicate the center position of the travel lane in the width direction. The first guide line and the second guide line are not limited to thin lines, and may be figures such as arrows that have the first front-side end point and the second front-side end point, respectively, as their end point on the front side.

The display control unit may superimpose on the forward image the second guide line in the case where the travel lane is branched into a plurality of the branched lanes at a lane branch point ahead and the lane branch point is located within a predetermined distance ahead of the vehicle, the second guide line having the second front-side end point indicating a position in the travel lane on the target lane side with respect to the center position of the travel lane in the width direction. This allows the driver to be conscious of a position in the travel lane on the target lane side with respect to the center position of the travel lane in the width direction immediately before the lane branch point is located within the predetermined distance ahead of the vehicle and the vehicle travels past the lane branch point. The predetermined distance may be defined as a distance over which the driver can recognize the lane branch point on the forward image or under direct vision. Displaying the second guide line having the second front-side end point indicating a position in the travel lane on the target lane side with respect to the center position of the travel lane in the width direction when the driver has become able to recognize the lane branch point allows the driver to recognize that the second front-side end point suggests the position of the target lane to be traveled after traveling past the lane branch point. Further, the display control unit may cause the display section to display the forward image on which the second guide line is superimposed in the case where the lane branch point is not located within the predetermined distance ahead of the vehicle but the travel lane is branched into a plurality of the branched lanes at a lane branch point ahead and a width of the travel lane is equal to or more than a predetermined width. This is because the vehicle can be moved to the target lane side in the travel lane, irrespective of the distance from the current position of the vehicle to the lane branch point, in the case where the width of the travel lane is equal to or more than the predetermined width, which allows the vehicle to smoothly enter the target lane at the lane branch point.

Further, in the case where the travel lane is branched into a plurality of the branched lanes at a lane branch point ahead, the display control unit may set the second guide line as follows. That is, the display control unit sets a variation point indicating a position in the travel lane on the target lane side with respect to the center position of the travel lane in the width direction and in rear of the second front-side end point. Then, the display control unit superimposes on the forward image the second guide line which is a straight line connecting between the variation point and the second front-side end point and includes a target lane-side guide line segment having a length equal to or more than a predetermined value. Making the length of the target lane-side guide line segment indicating a position in the travel lane on the target lane side with respect to the center position of the travel lane in the width direction equal to or more than the predetermined value in this way facilitates recognizing which side the target lane is located on in the travel lane with respect to the center position of the travel lane in the width direction.

Further, the display control unit may superimpose on the forward image the first guide line which is straight and has, as an end point of the first guide line on a rear side, a first rear-side end point indicating the center position of the travel lane in the width direction in the case where the travel lane is not branched into a plurality of the branched lanes at a lane branch point ahead. In the case where the vehicle continuously travels on the travel lane which is not branched at a lane branch point ahead, it can be considered that variations in position of the vehicle in the width direction in the travel lane are caused by a lurch of the vehicle not intended by the driver. By causing the first rear-side end point to indicate the center position of the travel lane in the width direction at all times in the case where the travel lane is not branched at a location ahead, it is possible to prevent the position of the first rear-side end point from varying in accordance with a lurch of the vehicle not intended by the driver. Thus, it is possible to prevent the driver from being cautioned unnecessarily.

The display control unit superimposes on the forward image the second guide line which has, as its end point on the rear side, a second rear-side end point indicating the center position of the vehicle in the width direction in the case where the travel lane is branched into a plurality of the branched lanes at a lane branch point ahead. That is, in the case where the travel lane is branched into a plurality of the branched lanes at a lane branch point ahead, the second rear-side end point indicates a position that follows the center position of the vehicle in the width direction. In the case where the travel lane is branched into a plurality of the branched lanes at a lane branch point ahead as discussed above, the second front-side end point indicates a position in the travel lane on the target lane side with respect to the center position of the travel lane in the width direction. This allows the driver to be conscious of a position in the travel lane on the target lane side with respect to the center position of the travel lane in the width direction. That is, the second rear-side end point of the second guide line can be caused to follow the center position of the vehicle in the width direction when the driver has become conscious of a position in the travel lane on the target lane side with respect to the center position of the travel lane in the width direction. Thus, the driver can travel the vehicle to the target lane side while recognizing the center position of the vehicle in the width direction.

In addition, in the case where the travel lane is branched into a plurality of branched lanes at a lane branch point ahead, the second front-side end point may be set as follows. That is, in the case where the travel lane is branched into M branched lanes, where M is a natural number of 2 or more, the target lane specifying unit specifies as the target lane an N-th branched lane as counted from a predetermined direction in the width direction of the travel lane, where N is a natural number of M or less. Then, the display control unit sets, as an end point of the second guide line on the front side, the second front-side end point indicating a position in an N-th divided region, among M divided regions obtained by dividing the travel lane in the width direction of the travel lane, that is the N-th as counted from the predetermined direction. That is, if the target lane is a branched lane, among M branched lanes, that is the N-th as counted from the predetermined direction, the second front-side end point indicates a position belonging to a divided region, among M divided regions obtained by dividing the travel lane in the width direction of the travel lane, that is the N-th as counted from the predetermined direction. This allows the driver to judge what is the number of the branched lane serving as the target lane as counted from the predetermined direction using the position indicated by the second front-side end point in the width direction of the travel lane as an indicator.

Further, the technique for suggesting a position on the target lane side after a branch using a guide line superimposed on a forward image according to the present invention can also be applied as a program and a method. The lane guidance display system, program, and method described above include various aspects such as those implemented using a single device and those implemented utilizing parts that are common to various members provided in the vehicle. That is, the units forming the lane guidance display system may be distributed to a plurality of substantive devices. In the case where the units are distributed to a plurality of substantive devices, a communication device that allows transmission and reception of data required to cause the units to function may be provided. Further, it is possible to provide a navigation device, method, and program including at least a part of the lane guidance display system described above. Various changes may be made. For example, some units may be implemented using software, and the others may be implemented using hardware. Further, the present invention may be implemented as a storage medium for a program that controls the lane guidance display system. It is a matter of course that the storage medium for the software may be a magnetic storage medium, an optical storage medium, or any storage medium that may be developed in the future.

DESCRIPTION OF EMBODIMENTS

Figure 1:
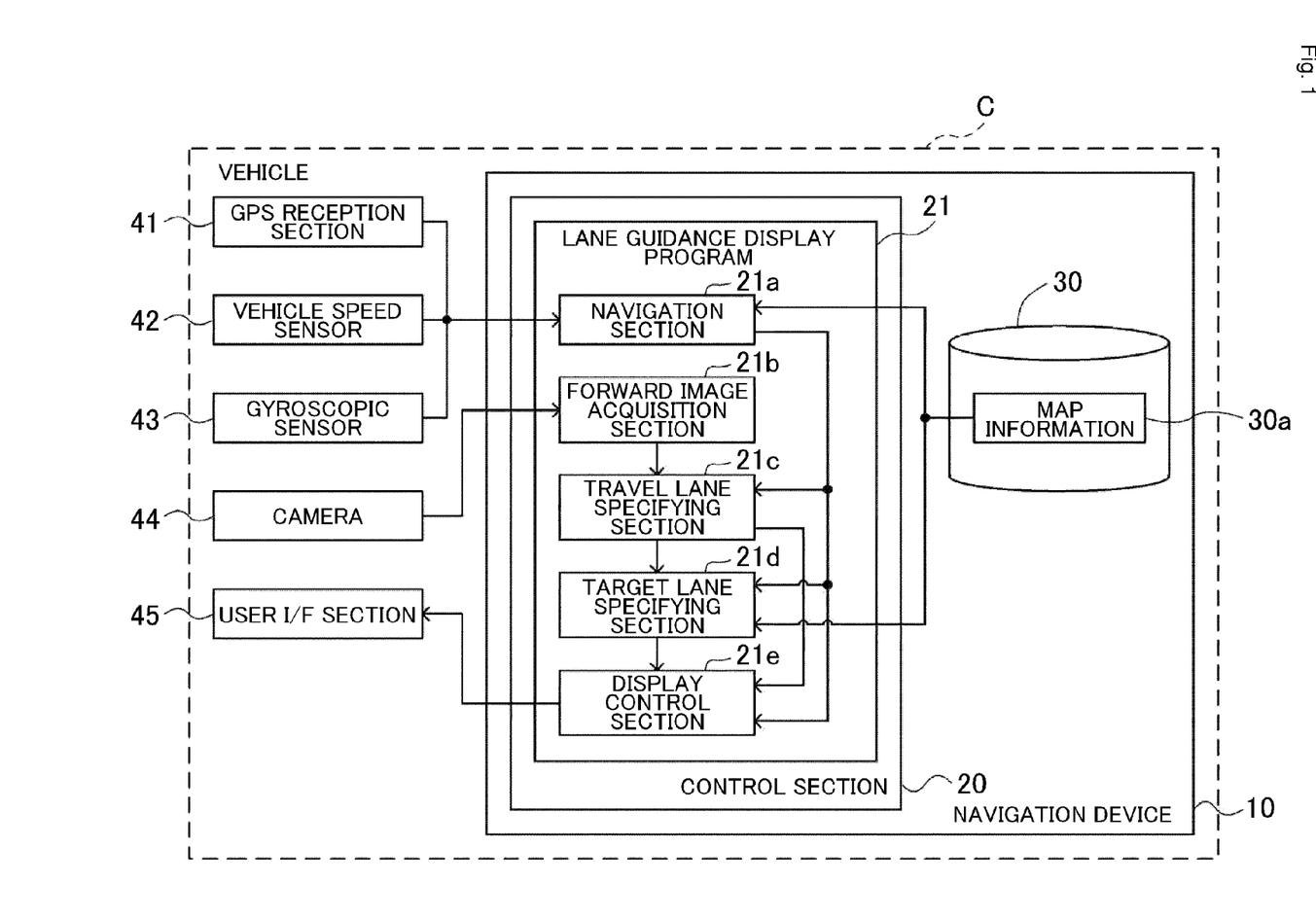
FIG. 1 is a block diagram of a navigation device according to an embodiment of the present invention.

An embodiment of the present invention will be described below in the following order:
 (1) Configuration of Navigation Device
 (2) Lane Guidance Display Process
 (3) Other Embodiments
 (1) Configuration of Navigation Device FIG. 1 is a block diagram showing the configuration of a navigation device 10 serving as a lane guidance display system according to an embodiment of the present invention. The navigation device 10 is provided in a vehicle C. The navigation device 10 includes a control section 20 and a storage medium 30. The control section 20 includes a CPU, a RAM, a ROM, etc., and executes a program stored in the storage medium 30 or the ROM. The storage medium 30 stores map information 30a. The map information 30a includes node data indicating nodes set in correspondence with end points (intersections) of roads in the traveling direction, link data indicating information on the roads between the nodes, shape interpolation point data for specifying the shape of the roads between the nodes, data indicating features existing on or around the roads, and so forth. The link data include lane information indicating the number of lanes included in each road, the lane number of each lane as counted from one side (in the embodiment, the left side) of the road in the width direction, roads that can be entered in the case where the vehicle travels each lane to the terminal point of the road in the traveling direction, and the type (shape, color, etc.) of partition lines partitioning each lane. For a lane branched into a plurality of branched lanes at a lane branch point at a midpoint (rather than an end point) of a road in the traveling direction, the lane information also includes lane branch information indicating the position of the lane branch point. In the embodiment, a lane is branched into two branched lanes at a lane branch point.

The vehicle C includes a GPS reception section 41, a vehicle speed sensor 42, a gyroscopic sensor 43, a camera 44, and a user I/F section 45. The GPS reception section 41 receives radio waves from GPS satellites to output a signal for calculating the current position of the vehicle C via an interface (not shown). The vehicle speed sensor 42 outputs a signal corresponding to the rotational speed of wheels of the vehicle C. The gyroscopic sensor 43 outputs a signal corresponding to angular acceleration acting on the vehicle C. The camera 44 is an image sensor that captures a forward image of a scene ahead of the vehicle C.

Figure 2:
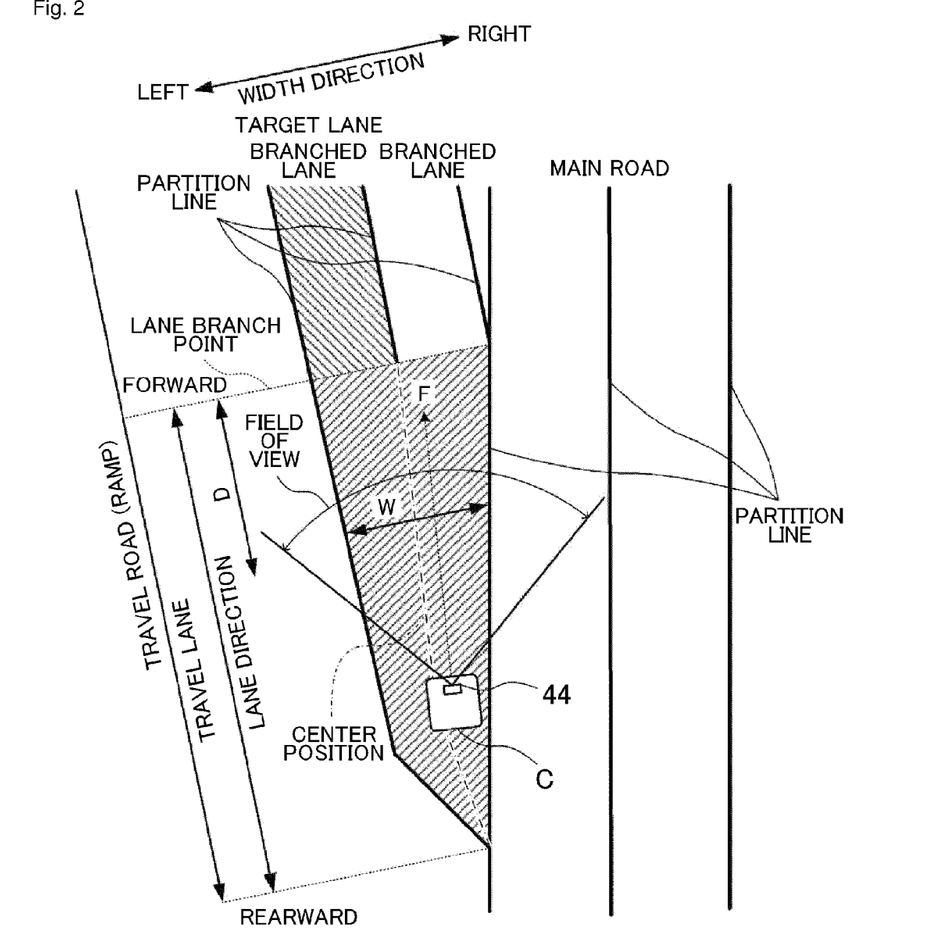
FIG. 2 is a plan view of a travel lane and branched lanes according to the embodiment.

FIG. 2 is a plan view showing how the camera 44 captures a forward image. As shown in FIG. 2, the camera 44 includes a scene ahead of the vehicle C in its field of view, and captures a forward image in which an overhead view of a scene ahead of the vehicle C is captured. The forward image captured by the camera 44 is output to the control section 20 via an interface (not shown). In the embodiment, the camera 44 is provided on the back side of a rear-view mirror provided at the center position of the vehicle C in the width direction. The user I/F section 45 includes an output device that outputs various types of guidance on the basis of a control signal output from the control section 20. The output device of the user I/F section 45 according to the embodiment includes a speaker that outputs guidance through sound, and a display serving as a display section that displays guidance through an image. The display is installed in such an orientation as to be visually recognized by the driver of the vehicle C, and installed such that the up-down direction and the transverse direction of an image displayed on the display respectively correspond to the vertical direction and the horizontal direction in the vehicle C.

A lane guidance display program 21 includes a navigation section 21a, a forward image acquisition section 21b, a travel lane specifying section 21c, a target lane specifying section 21d, and a display control section 21e.

The navigation section 21a is a module that causes the control section 20 to execute various functions required to provide guidance for an expected travel path to a destination. The control section 20, through the function of the navigation section 21a, specifies the current position of the vehicle C on the basis of the output signals from the GPS reception section 41, the vehicle speed sensor 42, and the gyroscopic sensor 43, and so forth. Then, the control section 20, through the function of the navigation section 21a, references the link data of the map information 30a to specify the road on which the current position of the vehicle C exists as a travel road. In addition, the control section 20, through the function of the navigation section 21a, references the map information 30a to find an expected travel path from the current position to the destination using a path search technique known in the art. In the embodiment, the expected travel path has been found in advance. The control section 20, through the function of the navigation section 21a, may acquire an expected travel path, and may acquire an expected travel path found by an external computer through communication.

The forward image acquisition section 21b is a module that causes the control section 20 to execute a function of acquiring a forward image in which a scene ahead of the vehicle C is captured. That is, the control section 20, through the function of the forward image acquisition section 21b, consecutively acquires forward images captured by the camera 44 at predetermined time intervals.

Figure 3A:
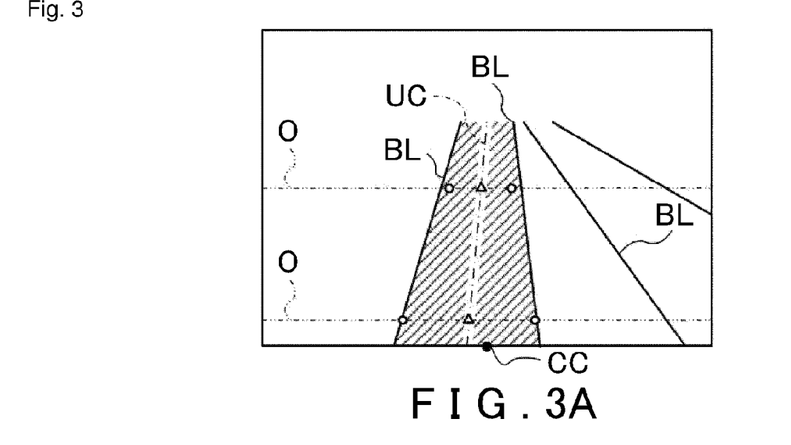
FIGS. 3A to 3C show a forward image according to the embodiment.
Figures 4, 4A:
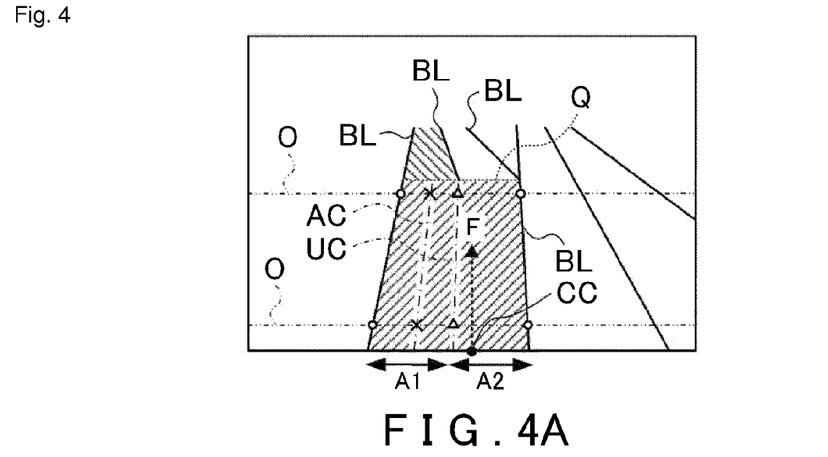
FIGS. 4A to 4C show an arrow-shaped guide line.

FIGS. 3A and 4A show forward images. In the case where the vehicle C travels horizontally, the upward direction in the up-down direction on a bisector dividing the forward image into two equal parts in the transverse direction indicates a direction straight ahead F of the camera 44 (at the center position of the vehicle C in the width direction). A vanishing point exists on the bisector dividing the forward image into two equal parts in the transverse direction. In the case where the vehicle C travels horizontally, a position in the forward image in the transverse direction corresponds to a position in the field of view of the camera 44 in the horizontal direction, in particular to a position on a lane in the width direction of the lane. Meanwhile, a position in the forward image in the up-down direction depends on a position in the field of view in the vertical direction, and on the distance from the camera 44. Thus, a position in the forward image that is higher in the up-down direction indicates a position that is farther ahead of the vehicle C in the traveling direction. In the embodiment, a middle point CC on the lower side of the forward image indicates the center position of the vehicle C in the width direction of the vehicle C.

The travel lane specifying section 21c is a module that causes the control section 20 to execute a function of specifying a travel lane currently traveled by the vehicle C. That is, the control section 20, through the function of the travel lane specifying section 21c, recognizes images of partition lines partitioning lanes from the forward image using a line recognition technique such as a Hough transform known in the art to specify a region partitioned by the images of the partition lines as images of lanes. The control section 20, through the function of the travel lane specifying section 21c, may reference the type of partition lines indicated by the lane information of the map information 30a to recognize images of partition lines. Further, the control section 20, through the function of the travel lane specifying section 21c, specifies an image of a lane that is the closest to the middle point CC on the lower side of the forward image, among the images of the lanes, as an image of the travel lane. In addition, the control section 20, through the function of the travel lane specifying section 21c, specifies the lane number of the travel lane by counting how many images of lanes there are in the forward image from the image of the leftmost lane to the image of the travel lane.

The target lane specifying section 21d is a module that causes the control section 20 to execute a function of in the case where the travel lane is branched into a plurality of branched lanes at a lane branch point ahead of the vehicle C, specifying a target lane to be traveled by the vehicle C after traveling past the lane branch point. That is, the control section 20, through the function of the target lane specifying section 21d, references the lane branch information included in the lane information of the map information 30a to determine whether or not there is any lane branch point in a section of the travel lane ahead of the vehicle C in the traveling direction. Then, in the case where there is any lane branch point in a section of the travel lane ahead of the vehicle C in the traveling direction, the control section 20, through the function of the target lane specifying section 21d, acquires the position of the lane branch point. In the case where there is any lane branch point in a section of the travel lane ahead of the vehicle C in the traveling direction, further, the control section 20, through the function of the target lane specifying section 21d, specifies the lane number of the target lane to be traveled by the vehicle C, among the plurality of branched lanes. Specifically, the control section 20, through the function of the target lane specifying section 21d, specifies a road to be traveled after the travel road currently traveled by the vehicle C in the expected travel path, and specifies a branched lane from which the specified road can be entered as the target lane. The lane from which the road to be traveled after the travel road can be entered may be specified by referencing the lane information of the map information 30a.

FIG. 2 shows a state immediately after the vehicle C enters a ramp from a main road such as a highway. The ramp includes only a travel lane (hatched with right-up lines) traveled by the vehicle C for a section immediately after being branched from the highway. However, the ramp is branched into two branched lanes at a lane branch point existing ahead of the vehicle C. The travel lane becomes wider toward the lane branch point. Here, it is assumed that the road to be traveled next can be entered at an intersection at the terminal point of the ramp from the left branched lane (hatched with right-down lines), among the two branched lanes. In this case, the control section 20, through the function of the target lane specifying section 21d, specifies the left branched lane (the lane number of which is 1), among the branched lanes, as the target lane.

The display control section 21e is a module that causes the control section 20 to execute a function of displaying on the user I/F section 45 a forward image on which a first guide line is superimposed in the case where the travel lane is not branched into a plurality of branched lanes, the first guide line having, as its end point on the front side, a first front-side end point indicating the center position of the travel lane in the width direction. The display control section 21e is also a module that causes the control section 20 to execute a function of displaying on the user I/F section 45 a forward image on which a second guide line is superimposed in the case where the travel lane is branched into a plurality of branched lanes, the second guide line having, as its end point on the front side, a second front-side end point indicating a position in the travel lane on the target lane side with respect to the center position of the travel lane in the width direction. That is, the control section 20, through the function of the display control section 21e, switches between a state (first display state) in which the first guide line is superimposed on the forward image and a state (second display state) in which the second guide line is superimposed on the forward image.

Specifically, the control section 20, through the function of the display control section 21e, enables the second display state in the case where the travel lane is branched into a plurality of branched lanes at a lane branch point ahead of the vehicle C and the lane branch point is located within a predetermined distance D ahead of the vehicle, or in the case where the travel lane is branched into a plurality of branched lanes and the width of the travel lane is equal to or more than a predetermined width W. That is, the control section 20, through the function of the display control section 21e, enables the second display state in the case where the travel lane is branched into a plurality of branched lanes at a lane branch point ahead of the vehicle C and at least one of the following conditions is met: the lane branch point is located within the predetermined distance D ahead of the vehicle C; and the width of the travel lane is equal to or more than the predetermined width W. The width of the travel lane to be compared with the predetermined width W in the embodiment is the width of the travel lane at the current position of the vehicle C. In the case where the vehicle C travels straight ahead F in FIG. 2, the lane branch point comes within the predetermined distance D ahead of the vehicle C before the width of the travel lane at the current position of the vehicle C becomes equal to or more than the predetermined width W. In the embodiment, the predetermined distance D is defined as a distance over which the driver can recognize the lane branch point under direct vision. Meanwhile, the predetermined width W is defined as a width that allows the vehicle C to be moved to a side in the travel lane, and may be defined as twice the width of the vehicle C, for example.

On the other hand, the control section 20, through the function of the display control section 21e, enables the first display state in the case where the travel lane is not branched into a plurality of branched lanes at a lane branch point ahead of the vehicle C. The control section 20, through the function of the display control section 21e, also enables the first display state in the case where the travel lane is branched into a plurality of branched lanes at a lane branch point ahead of the vehicle C but the lane branch point is not located within the predetermined distance D ahead of the vehicle C and the width of the travel lane at the current position of the vehicle C is not equal to or more than the predetermined width W. Respective points defining the first guide line for use in the first display state and the second guide line for use in the second display state will be described in detail below.

TABLE 1

| State of vehicle | First display state | Second display state |
| --- | --- | --- |
| Front-side end point | Center position of travel lane in width direction | Position in travel lane on recommended lane side with respect to center position of travel lane in width direction |
| Rear-side end point | Center position of travel lane in width direction | Center position of vehicle in width direction |
| Variation point | None | Positioned in divided region on target lane side, in rear of second front-side end point, and in front of second rear-side end point (with target lane-side straight segment having length corresponding to predetermined value) |

Table 1 indicates the positions indicated by the respective points defining the first guide line and the second guide line in the real space.

As indicated in Table 1, in the first display state, the control section 20, through the function of the display control section 21e, sets the first front-side end point indicating the center position of the travel lane in the width direction, and sets a first rear-side end point indicating the center position of the travel lane in the width direction. In setting the first front-side end point, the control section 20, through the function of the display control section 21e, specifies the center line of the travel lane indicating the center position of the travel lane in the width direction in the forward image. FIG. 3A shows a forward image in the first display state in which a lane branch point has not come within the predetermined distance D ahead of the vehicle C and the width of the travel lane at the current position has not become equal to or more than the predetermined width W. As shown in FIG. 3A, the control section 20, through the function of the display control section 21e, specifies in the forward image middle points (white triangles), in the transverse direction, between respective intersection points (white circles) of auxiliary straight lines O (dash-double-dot lines) in the transverse direction and images BL of partition lines on the left and right of the travel lane, and specifies that the specified middle points indicate the center position of the travel lane in the width direction. The control section 20, through the function of the display control section 21e, specifies respective middle points (white triangles), in the transverse direction, between the images BL of the partition lines on the left and right of the travel lane for each of the two or more auxiliary straight lines O at different positions in the up-down direction, and specifies a line connecting between the specified middle points (white triangles) as a center line UC (dash-and-dot line) indicating the center position of the travel lane in the width direction. In the case where the travel lane is not straight, the control section 20 may specify respective middle points (white triangles), in the transverse direction, between the images BL of the partition lines on the left and right of the travel lane for each of three or more auxiliary straight lines O, and specifies a curve or a polygonal line connecting between the specified middle points (white triangles) as the center line UC.

Figure 3B:
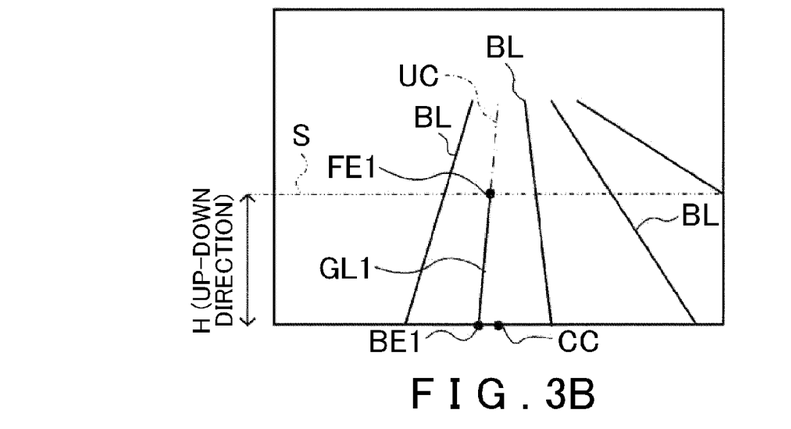
Figure 3C:
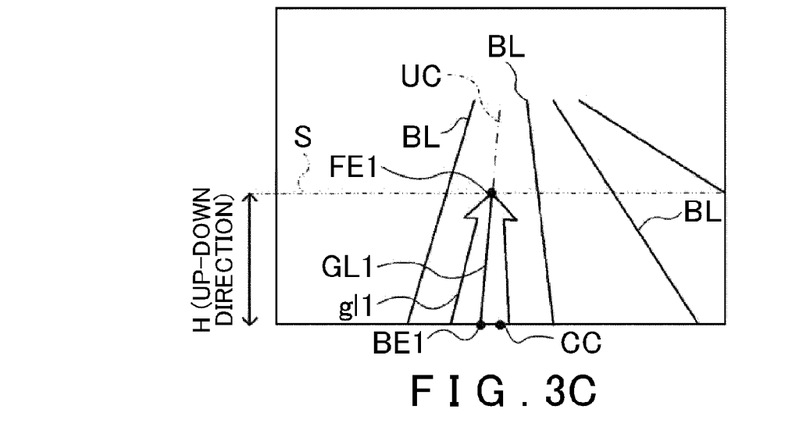

As shown in FIG. 3B, in the first display state, the control section 20, through the function of the display control section 21e, sets a first front-side end point FE1 at a position on the center line UC of the travel lane in the forward image and at a constant position H in the up-down direction of the forward image (at a position on an auxiliary line S in the transverse direction). Further, in the first display state, the control section 20, through the function of the display control section 21e, sets a first rear-side end point BE1 at a position on the center line UC of the travel lane in the forward image and on the lower side of the forward image. The control section 20, through the function of the display control section 21e, generates a straight and thin first guide line GL1 connecting between the first front-side end point FE1 and the first rear-side end point BE1. Since both the first front-side end point FE1 and the first rear-side end point BE1 are set on the center line UC of the travel lane, the first guide line GL1 is defined as a line on the center line UC. Further, as shown in FIG. 3C, the control section 20, through the function of the display control section 21e, generates an arrow-shaped first guide line gl1 that is line-symmetric with respect to the thin first guide line GL1, and causes the user I/F section 45 to display a forward image on which the arrow-shaped first guide line gl1 is superimposed. The first front-side end point FE1 defines the distal end of the head portion of the arrow-shaped first guide line gl1. The second display state will be described below.

As indicated in Table 1, in the second display state, the control section 20, through the function of the display control section 21e, sets the second front-side end point indicating a position in the travel lane on the target lane side with respect to the center position in the width direction, and sets a second rear-side end point indicating the center position of the vehicle in the width direction. FIG. 4A shows a forward image in the second display state in which a lane branch point is located within the predetermined distance D ahead of the vehicle C. As shown in FIG. 4A, in the second display state, the control section 20, through the function of the display control section 21e, sets a second rear-side end point BE2 at the middle point CC on the lower side of the forward image. The control section 20, through the function of the display control section 21e, executes a process of causing the user I/F section 45 to display a guide line as superimposed on a forward image each time forward images are acquired at predetermined time intervals. In each of the forward images acquired at the time intervals, the middle point CC on the lower side of the forward image indicates the center position of the vehicle C in the width direction at all times.

As shown in FIG. 4A, in the second display state, the control section 20, through the function of the display control section 21e, specifies a center line AC (dash-and-dot line) indicating the center position, in the width direction, of a divided region on the target lane side, among two divided regions obtained by dividing the travel lane in the width direction at the center position in the width direction. In FIG. 4A, images of the divided regions in the forward image are denoted as A1 and A2 from the left. Specifically, as shown in FIG. 4A, the control section 20, through the function of the display control section 21e, specifies in the forward image middle points (X marks), in the transverse direction, between respective intersections (white circles) of the auxiliary straight lines O (dash-double-dot lines) in the transverse direction and the image BL of the partition line of the travel lane on the target lane (left) side and respective intersections (white triangles) of the auxiliary straight lines O in the transverse direction and the center line UC of the travel lane, and specifies that the specified middle points (X marks) indicate the center position, in the width direction, of the divided region on the target lane side. The control section 20, through the function of the display control section 21e, specifies respective positions (X marks) indicating the center position of the divided region on the target lane side for each of the two or more auxiliary straight lines O at different positions in the up-down direction, and specifies a line connecting between the specified positions (X marks) indicating the center position, in the width direction, of the divided region on the target lane side as the center line AC indicating the center position, in the width direction, of the divided region on the target lane side.

Figure 4B:
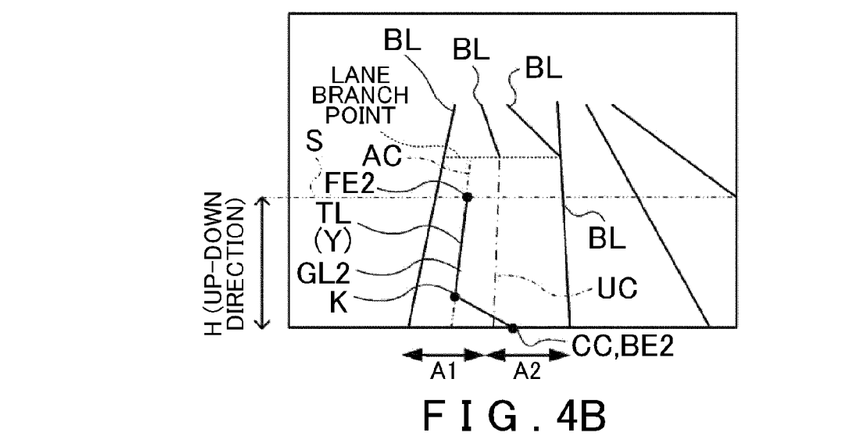
Figure 4C:
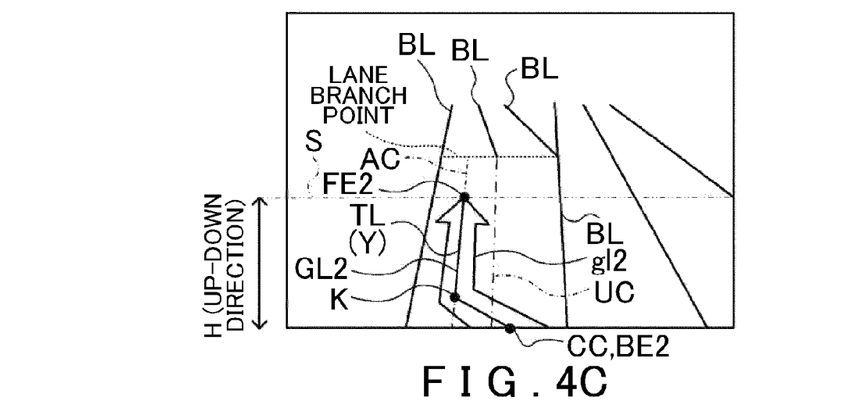

Then, as shown in FIG. 4B, in the second display state, the control section 20, through the function of the display control section 21e, sets a second front-side end point FE2 at a position on the center line AC of the travel lane on the target lane side and at the constant position H in the up-down direction of the forward image. Further, as shown in Table 1 and FIG. 4B, the control section 20, through the function of the display control section 21e, sets a variation point K indicating a position in the divided region on the target lane side, in rear of the second front-side end point FE2, and in front of the second rear-side end point BE2. Specifically, the control section 20, through the function of the display control section 21e, sets the variation point K on the center line AC of the divided region on the target lane side such that the length of a target lane-side guide line segment TL connecting between the second front-side end point FE2 and the variation point K is equal to a predetermined value Y. Then, as shown in FIG. 4B, in the second display state, the control section 20, through the function of the display control section 21e, generates a polygonal and thin second guide line GL2 connecting the second front-side end point FE2, the variation point K, and the second rear-side end point BE2 to each other. Further, as shown in FIG. 4C, the control section 20, through the function of the display control section 21e, generates an arrow-shaped second guide line gl2 that is line-symmetric with respect to the thin second guide line GL2, and causes the user I/F section 45 to display a forward image on which the arrow-shaped second guide line gl2 is superimposed. The second front-side end point FE2 defines the distal end of the head portion of the arrow-shaped second guide line gl2.

In the configuration described above, in the first display state, the control section 20, through the function of the display control section 21e, causes the user I/F section 45 to display the first guide line gl1 with the first front-side end point FE1 indicating the center position of the travel lane in the width direction. This allows the driver to recognize that the vehicle C should travel at the center position of the travel lane in the width direction. In the second display state in which the travel lane is branched into a plurality of branched lanes, meanwhile, the control section 20, through the function of the display control section 21e, causes the user I/F section 45 to display the second guide line gl2 with the second front-side end point FE2 indicating a position in the travel lane on the target lane side with respect to the center position of the travel lane in the width direction. This allows the driver to be conscious of a position in the travel lane on the target lane side. That is, by allowing the driver to be conscious of a position in the travel lane on the target lane side in advance before the vehicle C travels past the lane branch point, it is possible to prevent the driver from having a feeling that the vehicle C should travel on the extended line of the center line indicating the center position of the travel lane in the width direction, not to give an uncomfortable feeling to the driver. In addition, the vehicle C can be guided to the target lane at the lane branch point. In the case where two branched lanes are formed by dividing the travel lane into two equal parts at the lane branch point as shown in FIG. 2, displaying the first guide line gl1 with the first front-side end point FE1 indicating the center position of the travel lane in the width direction would cause the driver to feel as if the first guide line gl1 indicated the partition line partitioning the two branched lanes, which would give the driver an uncomfortable feeling. In contrast, displaying the second guide line gl2 with the second front-side end point FE2 indicating a position in the travel lane on the target lane side with respect to the center position of the travel lane in the width direction (FIG. 4C) can cause the second guide line gl2 to indicate a position shifted in the width direction from the partition line partitioning the two branched lanes, which prevents the driver from feeling uncomfortable.

Meanwhile, the control section 20, through the function of the display control section 21e, enables the second display state in which the second guide line gl2 is superimposed on the forward image in the case where the travel lane is branched into a plurality of branched lanes and the lane branch point is located within the predetermined distance D ahead of the vehicle C. This allows the driver to be conscious of a position in the travel lane on the target lane side with respect to the center position of the travel lane in the width direction immediately before the lane branch point is located within the predetermined distance D ahead of the vehicle C and the vehicle C travels past the lane branch point. Further, the control section 20, through the function of the display control section 21e, also enables the second display state in which the forward image in which the second guide line gl2 is superimposed is displayed in the case where the lane branch point is not located within the predetermined distance D ahead of the vehicle C but the travel lane is branched into a plurality of branched lanes and the width of the travel lane is equal to or more than the predetermined width W. This allows the vehicle C to be guided to be moved to the target lane side in the travel lane when the width of the travel lane has become equal to or more than the predetermined width W, which allows the vehicle C to smoothly enter the target lane at the lane branch point.

Further, in the second display state, the control section 20, through the function of the display control section 21e, sets the variation point K indicating a position in the travel lane on the target lane side with respect to the center position of the travel lane in the width direction and in rear of the second front-side end point FE2. Then, the control section 20, through the function of the display control section 21e, displays the second guide line gl2 which is a straight line connecting between the variation point K and the second front-side end point FE2 and including the target lane-side guide line segment TL having a length of equal to or more than the predetermined value Y. This facilitates recognizing which side the target lane is located on with respect to the center position of the travel lane in the width direction.

Further, in the first display state in which the travel lane is not branched at a location ahead, the control section 20, through the function of the display control section 21e, superimposes on the forward image the first guide line which is straight and has, as its end point on the rear side, the first rear-side end point BE1 indicating the center position of the travel lane in the width direction. In the first display state in which the vehicle continuously travels in the travel lane which is not branched at a location ahead, it can be considered that variations in position of the vehicle C in the width direction in the travel lane are caused by a lurch of the vehicle C not intended by the driver. By causing the first rear-side end point BE1 to indicate the center position of the travel lane in the width direction at all times in the first display state in which the travel lane is not branched at a location ahead, it is possible to prevent the position of the first rear-side end point BE1 from varying in accordance with a lurch of the vehicle C not intended by the driver. Thus, it is possible to prevent the driver from being cautioned unnecessarily.

Meanwhile, in the second display state in which the travel lane is branched into a plurality of branched lanes, the control section 20, through the function of the display control section 21e, superimposes on the forward image the second guide line having, as its end point on the rear side, the second rear-side end point BE2 indicating the center position of the vehicle C in the width direction. That is, in the second display state, the second rear-side end point indicates a position that follows the center position of the vehicle in the width direction. In the second display state, as discussed above, the second front-side end point FE2 indicates a position in the travel lane on the target lane side with respect to the center position of the travel lane in the width direction. Therefore, the driver becomes conscious of a position in the travel lane on the target lane side with respect to the center position of the travel lane in the width direction. That is, the second rear-side end point BE2 of the second guide line gl2 can be caused to follow the center position of the vehicle C in the width direction when the driver has become conscious of a position in the travel lane on the target lane side with respect to the center position of the travel lane in the width direction. Thus, the driver can travel the vehicle C to the target lane side while recognizing the center position of the vehicle C in the width direction.

(2) Lane Guidance Display Process

Figure 5A:
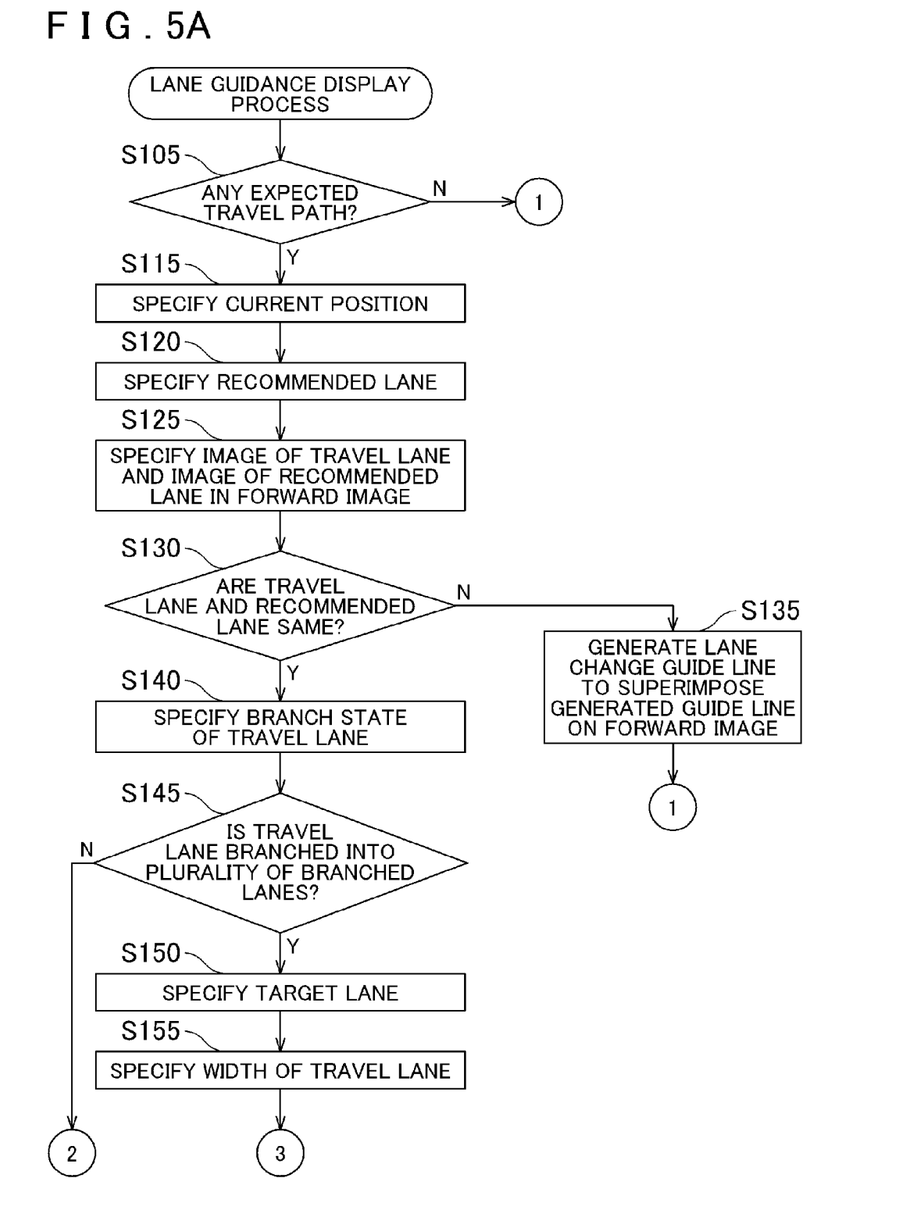
FIG. 5A is a flowchart of a lane guidance display process.
Figure 5B:
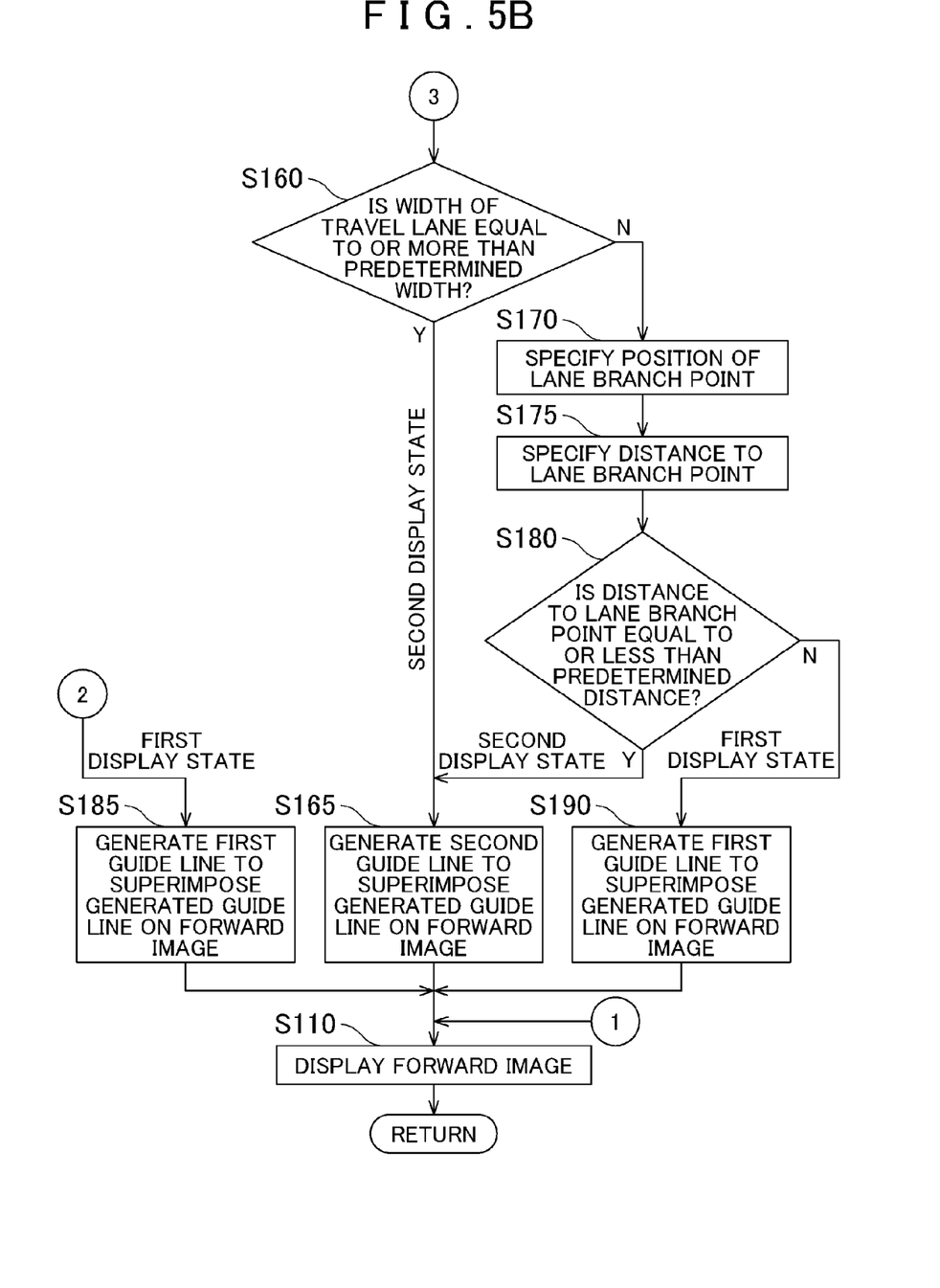
FIG. 5B is a flowchart of a lane guidance display process.

Next, a lane guidance display process executed by the function of the lane guidance display program 21 will be described. FIGS. 5A and 5B are a flowchart of the lane guidance display process. The lane guidance display process is a looped process executed each time the control section 20, through the function of the forward image acquisition section 21b, acquires forward images at predetermined time intervals. The control section 20, through the function of the travel lane specifying section 21c, determines whether or not any expected travel path has been found (S105). In the case where any expected travel path has not been found, the control section 20, through the function of the display control section 21e, causes the user I/F section 45 to display a forward image (S110). In the case where any expected travel path has not been found, no guide line is generated so that the user I/F section 45 displays a forward image on which no guide line is superimposed (S105, S110).

In the case where it is determined in step S105 that any expected travel path has been found, on the other hand, the control section 20, through the function of the navigation section 21a, specifies the current position of the vehicle C on the basis of the output signals from the GPS reception section 41, the vehicle speed sensor 42, and the gyroscopic sensor 43, and so forth (S115). The control section 20, through the function of the navigation section 21a, may specify an image of a feature, the position of which in the real space is known, in the forward image, and specify the current position of the vehicle C on the basis of the position of the image of the feature in the forward image. Next, the control section 20, through the function of the navigation section 21a, specifies a recommended lane (S120). The target lane and the recommended lane are the same in being a lane from which the vehicle C can enter the road to be traveled after the travel road currently traveled by the vehicle C in the expected travel path. However, the target lane is a branched lane branched at a lane branch point ahead of the vehicle C. Therefore, the target lane and the recommended lane are different from each other as follows. That is, while the recommended lane is a lane to which the vehicle C can make a lane change before reaching the lane branch point ahead, the target lane is a lane that cannot be traveled by the vehicle C before reaching the lane branch point. In other words, while the recommended lane exists on one of the left and right, in the width direction, of the vehicle C at the current position, the target lane does not exist on the left or right, in the width direction, of the vehicle C at the current position. The control section 20, through the function of the navigation section 21a, specifies the travel road on the basis of the current position and the map information 30a, and specifies the recommended lane, from which the road to be traveled after the travel road in the expected travel path can be entered, and the lane number of the specified recommended lane.

When the recommended lane is specified, the control section 20, through the function of the travel lane specifying section 21c, specifies an image of the travel lane currently traveled by the vehicle C and an image of the recommended lane in the forward image (S125). Specifically, the control section 20, through the function of the travel lane specifying section 21*c*, specifies, among images of lanes specified by recognizing images of partition lines in the forward image, an image of a lane that is the closest to the middle point CC on the lower side of the forward image, which indicates the center position of the vehicle C in the width direction, as an image of the travel lane. In addition, the control section 20, through the function of the travel lane specifying section 21*c*, specifies as a recommended lane, an image of a lane, the lane number of which as counted from an image of the leftmost lane corresponds to the lane number of the recommended lane in the forward image. In the case where the vehicle C already travels in the recommended lane, the travel lane and the recommended lane are the same.

Next, the control section 20, through the function of the display control section 21*e*, determines whether or not the travel lane and the recommended lane are the same (S130). In the case where it is not determined that the travel lane and the recommended lane are the same, the control section 20, through the function of the display control section 21*e*, generates a lane change guide line, and superimposes the generated lane change guide line on the forward image (S135). That is, in the case where the travel lane and the recommended lane are different, the control section 20, through the function of the display control section 21*e*, generates a lane change guide line having, as its end point on the front side, a front-side end point indicating the center position of the recommended lane in the width direction and having, as its end point on the rear side, a rear-side end point indicating the center position of the vehicle C in the width direction. Specifically, the control section 20, through the function of the display control section 21*e*, specifies a center line indicating the center position of the recommended lane in the width direction in the forward image using the same technique used to specify the center line UC of the travel lane, and sets the front-side end point of the lane change guide line at a position on the center line of the recommended lane and at the constant position H in the up-down direction of the forward image. Further, the control section 20, through the function of the display control section 21*e*, sets the rear-side end point of the lane change guide line at a position on the middle point CC on the lower side indicating the center position of the vehicle C in the width direction in the forward image. Then, the control section 20, through the function of the display control section 21*e*, generates a thin lane change guide line connecting between the front-side end point and the rear-side end point, generates an arrow-shaped lane change guide line that is line-symmetric with respect to the thin guide line, and superimposes the arrow-shaped lane change guide line on the forward image. When the lane change guide line is superimposed on the forward image, the control section 20, through the function of the display control section 21*e*, causes the user I/F section 45 to display the forward image (S110). The front-side end point of the lane change guide line indicates a position in the recommended lane which is different from the travel lane. Therefore, the lane change guide line allows the driver to recognize that a lane change to the recommended lane should be made. The rear-side end point indicates a position in the width direction of the lane that varies in accordance with movement of the vehicle C to the recommended lane side in the lane change. Therefore, the lane change guide line also allows the driver to recognize the degree of progress of the lane change.

In the case where it is determined in step S130 that the travel lane and the recommended lane are the same, on the other hand, the control section 20, through the function of the target lane specifying section 21*d*, specifies a branch state of the travel lane (S140). That is, the control section 20, through the function of the display control section 21*e*, acquires lane branch information included in the lane information on the travel lane from the map information 30*a*, and specifies the branch state of the travel lane on the basis of the acquired lane branch information. The control section 20, through the function of the target lane specifying section 21*d*, determines whether or not the travel lane is branched into a plurality of branched lanes at a lane branch point ahead of the vehicle C (S145).

In the case where it is not determined in step S145 that the travel lane is branched into a plurality of branched lanes at a lane branch point ahead of the vehicle C, the control section 20, through the function of the display control section 21*e*, currently enables the first display state, and generates a first guide line gl1, and superimposes the first guide line gl1 on the forward image (S185). The first guide line gl1 is a straight line on the center line UC of the travel lane having, as its end point on the front side, a front-side end point indicating the center position of the travel lane in the width direction and having, as its end point on the rear side, a rear-side end point indicating the center position of the vehicle C in the width direction indicating the center position of the travel lane in the width direction (FIG. 3B). The control section 20, through the function of the display control section 21*e*, generates a thin lane change guide line GL1 connecting between the front-side end point and the rear-side end point, generates an arrow-shaped first guide line gl1 that is line-symmetric with respect to the thin guide line GL1, and superimposes the arrow-shaped lane change guide line gl1 on the forward image (FIG. 3C). When the first guide line gl1 is superimposed on the forward image, the control section 20, through the function of the display control section 21*e*, causes the user I/F section 45 to display the forward image (S110). Both the first front-side end point FE1 and the first rear-side end point BE1 of the first guide line gl1 indicate the center position of the travel lane in the width direction. Therefore, the first guide line gl1 which allows the driver to recognize that the vehicle C should travel at the center position of the travel lane in the width direction can be generated. This allows the user I/F section 45 to display a forward image on which the first guide line gl1 is superimposed, the first guide line gl1 allowing the driver to recognize that the vehicle C should travel at the center position of the travel lane in the width direction, in the case where the travel lane and the recommended lane are the same and the travel lane is not branched into a plurality of branched lanes.

In the case where it is determined that the travel lane is branched into a plurality of travel lanes at a lane branch point ahead of the vehicle C, on the other hand, the control section 20, through the function of the target lane specifying section 21*d*, specifies a target lane (S150). Specifically, the control section 20, through the function of the target lane specifying section 21*d*, references the lane information of the map information 30*a*, and specifies a branched lane from which a road to be traveled after the travel road currently traveled by the vehicle C in the expected travel path can be entered as the target lane. Further, the control section 20, through the function of the travel lane specifying section 21*c*, specifies the width of the travel lane at the current position of the vehicle C (S155).

The control section 20, through the function of the display control section 21*e*, determines whether or not the width of the travel lane is equal to or more than the predetermined width W (S160). In the case where it is determined that the width of the travel lane is equal to or more than the predetermined width W, the control section 20, through the function of the display control section 21*e*, currently enables the second display state, and generates a second guide line gl2, and superimposes the second guide line gl2 on the forward image (S165). That is, the control section 20, through the function of the display control section 21e, sets the second front-side end point FE2 indicating a position in the travel lane on the target lane side with respect to the center position in the width direction, and sets the second rear-side end point BE2 indicating the center position of the vehicle C in the width direction. Specifically, the control section 20, through the function of the display control section 21e, specifies an image A1 of a divided region on the target lane side, of divided regions obtained by dividing the travel lane in the width direction at the center position, in the forward image (FIG. 4A). Then, the control section 20, through the function of the display control section 21e, specifies the center line AC dividing the image A1 of the divided region on the target lane side into two equal parts, sets the second front-side end point FE2 at a position on the center line AC and at the constant position H in the up-down direction of the forward image, and sets the second rear-side end point BE2 on the middle point CC indicating the center position of the vehicle C in the width direction in the forward image (FIG. 4B). Further, the control section 20, through the function of the display control section 21e, sets the variation point K on the center line AC of the divided region on the target lane side such that the length of the target lane-side guide line segment TL connecting between the second front-side end point FE2 and the variation point K is equal to the predetermined value Y (FIG. 4B).

Then, in the second display state, the control section 20, through the function of the display control section 21e, generates a polygonal and thin second guide line GL2 connecting the second front-side end point FE2, the variation point K, and the second rear-side end point BE2 to each other (FIG. 4B). Further, the control section 20, through the function of the display control section 21e, generates an arrow-shaped second guide line gl2 that is line-symmetric with respect to the thin second guide line GL2 (FIG. 4C). When the second guide line gl2 is superimposed on the forward image in step S165, the control section 20, through the function of the display control section 21e, causes the user I/F section 45 to display the forward image (S110). This allows the driver to be conscious of a position in the travel lane on the target lane side with respect to the center position of the travel lane in the width direction in the case where the travel lane is branched into a plurality of branched lanes at a lane branch point ahead of the vehicle C and the width of the travel lane is so large that the vehicle C can be moved to a side. Thus, it is possible to prevent the driver from having an uncomfortable feeling that the vehicle C should keep traveling on the extended line of the center line indicating the center position of the current travel lane in the width direction even after traveling past the lane branch point. In addition, a length corresponding to the predetermined value Y of the target lane-side guide line segment TL, which indicates a position in the travel lane on the target lane side with respect to the center position of the travel lane in the travel lane, can be secured. This reliably allows the driver to be conscious of a position in the travel lane on the target lane side with respect to the center position of the travel lane in the width direction.

In the case where it is not determined in step S160 that the width of the travel lane is equal to or more than the predetermined width W, on the other hand, the control section 20, through the function of the display control section 21e, specifies the position of the lane branch point on the basis of the lane branch information of the map information 30a (S170). Further, the control section 20, through the function of the display control section 21e, specifies the distance to the lane branch point (S175). The distance to the lane branch point is the distance between the current position of the vehicle C and the lane branch point in the lane direction of the travel lane. The control section 20, through the function of the display control section 21e, determines whether or not the distance to the lane branch point is equal to or less than the predetermined distance D (S180). In the case where it is determined that the distance to the lane branch point is equal to or less than the predetermined distance D, the control section 20, through the function of the display control section 21e, currently enables the second display state, and superimposes the second guide line gl2 on the forward image (FIG. 4C, S165), and causes the user I/F section 45 to display the forward image (S110). This makes it possible to prevent the driver from having an uncomfortable feeling that the vehicle C should keep traveling on the extended line of the center line indicating the center position of the current travel lane in the width direction in the case where the travel lane is branched into a plurality of branched lanes at a lane branch point ahead of the vehicle C and the vehicle C is just about to travel past the lane branch point.

In the case where it is not determined in step S180 that the distance to the lane branch point is equal to or less than the predetermined distance D, the control section 20, through the function of the display control section 21e, currently enables the first display state, and generates a first guide line gl1, and superimposes the first guide line gl1 on the forward image (S190). When the first guide line gl1 is superimposed on the forward image, the control section 20, through the function of the display control section 21e, causes the user I/F section 45 to display the forward image (S110). This allows the driver to recognize that the vehicle C should travel at the center position of the travel lane in the width direction for a while in the case where the travel lane is branched into a plurality of branched lanes at a lane branch point ahead of the vehicle C but the width of the travel lane is not so large that the vehicle C can be moved to a side and the vehicle C is not just about to travel past the lane branch point. In the embodiment described above, the lane change guide line, the first guide line gl1, and the second guide line gl2 may be superimposed on the forward image, and all of these lines have an end point on the front side positioned at the constant position H of the forward image in the up-down direction. Thus, it is possible to prevent the position of the end point on the front side of the guide line from varying in the up-down direction in the case where any of the lane change guide line, the first guide line gl1, and the second guide line gl2 is displayed.

(3) Other Embodiments

In the example of FIG. 2 for the embodiment described above, the control section 20, through the function of the target lane specifying section 21d, specifies as the target lane a branched lane, among the two branched lanes branched from the travel lane, the lane number of which as counted from the left is 1. Further, the control section 20, through the function of the display control section 21e, can superimpose on an image the second guide line gl2 having, as its end point on the front side, the second front-side end point FE2 indicating a position in a divided region, among two divided regions obtained by dividing the travel lane in the width direction of the travel lane, that is the first as counted from the left. In the embodiment described above, the travel lane is divided into two branched lanes at a lane branch point. However, the travel lane may be divided into three or more branched lanes at a lane branch point, in which case the control section 20, through the function of the display control section 21e, may generate a second guide line gl2 using the same technique.

Figure 6A:
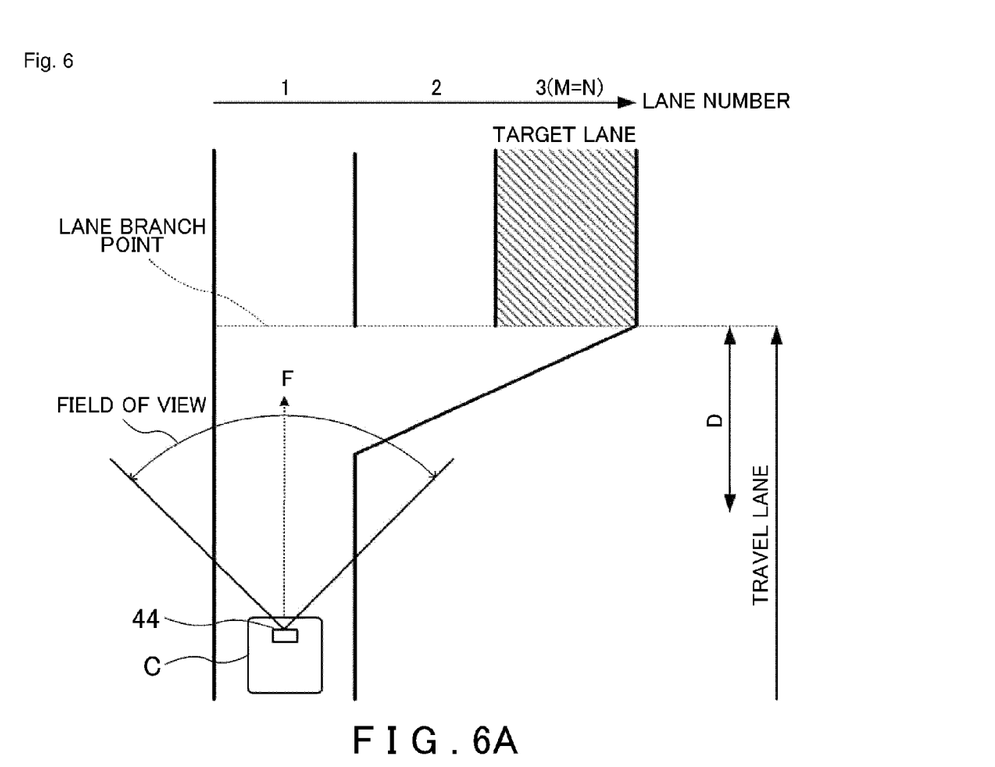
FIG. 6A is a plan view of a travel lane and branched lanes according to another embodiment of the present invention.
Figure 6B:
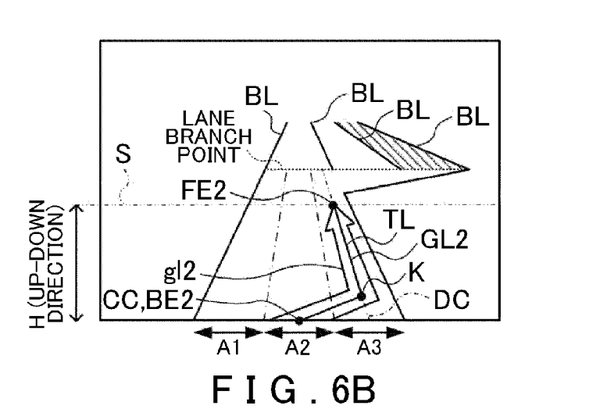
FIG. 6B shows a forward image according to the other embodiment.

FIG. 6A is a plan view showing how the travel lane is branched into three or more branched lanes at a lane branch point ahead of the vehicle C. In this case, the control section 20, through the function of the target lane specifying section 21*d*, specifies as the target lane a branched lane, among the three branched lanes branched from the travel lane, the lane number of which as counted from the left is 3. Then, as shown in FIG. 6B, the control section 20, through the function of the display control section 21*e*, superimposes on a forward image the second guide line gl2 having, as its end point on the front side, the second front-side end point FE2 indicating a position in a divided region, among three divided regions obtained by dividing the travel lane in the width direction of the travel lane, that is the third as counted from the left. In FIG. 6B, images of the divided regions in the forward image are denoted as A1 to A3 from the left. Displaying such a second guide line gl2 allows the driver to judge which branched lane is the target lane based on the position indicated by the second front-side end point in the width direction of the travel lane as an indicator.

The control section 20, through the function of the target lane specifying section 21*d*, may specify as the target lane a branched lane to be traveled by the vehicle C, and may specify as the target lane a branched lane that can be traveled safely or smoothly compared to other lanes in a section to by traveled by the vehicle C after traveling past a lane branch point. In addition, the control section 20, through the function of the display control section 21*e*, may superimpose on the forward image a second guide line gl2, the entirety of which indicates a position in the travel lane on the target lane side with respect to the center position of the travel lane in the width direction. Further, the control section 20, through the function of the display control section 21*e*, may superimpose on the forward image a first guide line gl1, only a part of which including the first front-side end point FE1 indicates the center position of the travel lane in the width direction. Moreover, a forward image on which each of the thin first guide line GL1 and second guide line GL2 is superimposed may be displayed.

The invention claimed is:

1. A lane guidance display system comprising:
a memory storing a lane guidance display program; and
a processor that, when executing the stored program:
acquires a forward image in which a scene ahead of a vehicle is captured;
specifies a travel lane currently traveled by the vehicle;
determines whether the travel lane is branched into a plurality of branched lanes at a lane branch point ahead of the vehicle;
determines whether the lane branch point is located within a predetermined distance ahead of the vehicle;
determines whether a width of the travel lane is equal to or more than a predetermined width;
when the travel lane is branched into a plurality of branched lanes at the lane branch point ahead of the vehicle, specifies a target lane to be traveled by the vehicle after traveling past the lane branch point;
causes a display to display the forward image on which a first guide line is superimposed when the travel lane is not branched into a plurality of branched lanes, the first guide line having, as an end point of the first guide line on a front side, a first front-side end point indicating a center position of the travel lane in a width direction; and
causes the display to display the forward image on which a second guide line is superimposed when (i) the travel lane is branched into a plurality of branched lanes and the lane branch point is located within a predetermined distance ahead of the vehicle; or (ii) the travel lane is branched into a plurality of the branched lanes and a width of the travel lane is equal to or more than a predetermined width, the second guide line having, as an end point of the second guide line on the front side, a second front-side end point indicating a position in the travel lane on a target lane side with respect to the center position of the travel lane in the width direction.

2. The lane guidance display system according to claim 1, wherein the processor, when executing the stored program:
when the travel lane is branched into a plurality of the branched lanes;
sets a variation point indicating a position in the travel lane on the target lane side with respect to the center position of the travel lane in the width direction and in rear of the second front-side end point; and
superimposes on the forward image the second guide line which is a straight line connecting between the variation point and the second front-side end point and including a target lane-side guide line segment having a length equal to or more than a predetermined value.

3. The lane guidance display system according to claim 1, wherein the processor, when executing the stored program:
superimposes on the forward image the first guide line which is straight and has, as an end point of the first guide line on a rear side, a first rear-side end point indicating the center position of the travel lane in the width direction in the case where the travel lane is not branched into a plurality of the branched lanes; and
superimposes on the forward image the second guide line which has, as an end point of the second guide line on the rear side, a second rear-side end point indicating the center position of the vehicle in the width direction in the case where the travel lane is branched into a plurality of the branched lanes.

4. The lane guidance display system according to claim 1, wherein the processor, when executing the stored program:
when the travel lane is branched into M branched lanes, where M is a natural number of 2 or more, specifies as the target lane an N-th branched lane as counted from a predetermined direction in the width direction of the travel lane, where N is a natural number of M or less; and
when the travel lane is branched into M branched lanes, superimposes on the forward image the second guide line having, as the end point of the second guide line on a front side, the second front-side end point indicating a position in an N-th divided region, among M divided regions obtained by dividing the travel lane in the width direction of the travel lane, that is the N-th as counted from the predetermined direction.

5. A lane guidance display method comprising:
acquiring a forward image in which a scene ahead of a vehicle is captured;
specifying a travel lane currently traveled by the vehicle;
determining whether the travel lane is branched into a plurality of branched lanes at a lane branch point ahead of the vehicle;
determining whether the lane branch point is located within a predetermined distance ahead of the vehicle;
determining whether a width of the travel lane is equal to or more than a predetermined width;
specifying, when the travel lane is branched into a plurality of branched lanes at the lane branch point ahead of the vehicle, a target lane to be traveled by the vehicle after traveling past the lane branch point;
causing a display to display the forward image on which a first guide line is superimposed when the travel lane is not branched into a plurality of branched lanes, the first guide line having, as an end point of the first guide line on a front side, a first front-side end point indicating a center position of the travel lane in a width direction; and causing the display to display the forward image on which a second guide line is superimposed when (i) the travel lane is branched into a plurality of branched lanes and the lane branch point is located within a predetermined distance ahead of the vehicle; or (ii) the travel lane is branched into a plurality of the branched lanes and a width of the travel lane is equal to or more than a predetermined width, the second guide line having, as an end point of the second guide line on the front side, a second front-side end point indicating a position in the travel lane on a target lane side with respect to the center position of the travel lane in the width direction.

6. A non-transitory storage medium storing a computer-executable lane guidance display program causing a computer to execute:

a forward image acquisition function of acquiring a forward image in which a scene ahead of a vehicle is captured;

a travel lane specifying function of specifying a travel lane currently traveled by the vehicle;

a first branch point determining function of determining whether the travel lane is branched into a plurality of branched lanes at a lane branch point ahead of the vehicle;

a second branch point determining function of determining whether the lane branch point is located within a predetermined distance ahead of the vehicle;

a lane width determining function of determining whether a width of the travel lane is equal to or more than a predetermined width;

a target lane specifying function of when the travel lane is branched into a plurality of branched lanes at a lane branch point ahead of the vehicle, specifying a target lane to be traveled by the vehicle after traveling past the lane branch point;

a first display control function of causing a display section to display the forward image on which a first guide line is superimposed when the travel lane is not branched into a plurality of branched lanes, the first guide line having, as an end point of the first guide line on a front side, a first front-side end point indicating a center position of the travel lane in a width direction; and a second display control function of causing the display section to display the forward image on which a second guide line is superimposed when (i) the travel lane is branched into a plurality of branched lanes and the lane branch point is located within a predetermined distance ahead of the vehicle; or (ii) the travel lane is branched into a plurality of the branched lanes and a width of the travel lane is equal to or more than a predetermined width, the second guide line having, as an end point of the second guide line on the front side, a second front-side end point indicating a position in the travel lane on a target lane side with respect to the center position of the travel lane in the width direction.

7. A lane guidance display system comprising:

a memory storing a lane guidance display program; and a processor that, when executing the stored program:

acquires a forward image in which a scene ahead of a vehicle is captured;

specifies a travel lane currently traveled by the vehicle;

determines whether the travel lane is branched into a plurality of branched lanes at a lane branch point ahead of the vehicle when the travel lane is branched into a plurality of branched lanes at a lane branch point ahead of the vehicle, specifies a target lane to be traveled by the vehicle after traveling past the lane branch point; and causes a display to display the forward image on which a first guide line is superimposed when the travel lane is not branched into a plurality of branched lanes, the first guide line having, as an end point of the first guide line on a front side, a first front-side end point indicating a center position of the travel lane in a width direction;

causes the display to display the forward image on which a second guide line is superimposed when the travel lane is branched into a plurality of branched lanes, the second guide line having, as an end point of the second guide line on the front side, a second front-side end point indicating a position in the travel lane on a target lane side with respect to the center position of the travel lane in the width direction; and when the travel lane is branched into a plurality of the branched lanes:

sets a variation point indicating a position in the travel lane on the target lane side with respect to the center position of the travel lane in the width direction and in rear of the second front-side end point; and superimposes on the forward image the second guide line which is a straight line connecting between the variation point and the second front-side end point and including a target lane-side guide line segment having a length equal to or more than a predetermined value.

* * * * *